(12) United States Patent
Zhang

(10) Patent No.: US 8,947,147 B1
(45) Date of Patent: Feb. 3, 2015

(54) APPARATUS FOR HIGH ROTATION RATE LOW I/O COUNT PHASE INTERPOLATOR

(71) Applicant: Broadcom Corporation, Irvine, CA (US)

(72) Inventor: Wei Zhang, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/013,938

(22) Filed: Aug. 29, 2013

(51) Int. Cl.
*H03H 11/16* (2006.01)
*H03K 3/00* (2006.01)
*H04L 27/18* (2006.01)

(52) U.S. Cl.
CPC ........................................ *H04L 27/18* (2013.01)
USPC ............................ 327/238; 327/254; 327/256

(58) Field of Classification Search
USPC .................................. 327/237, 238, 254–256
See application file for complete search history.

(56) References Cited

U.S. PATENT DOCUMENTS 7,282,979 B2 * 10/2007 Tanaka et al. .................. 327/237
8,269,543 B2 * 9/2012 Teetzel .......................... 327/254

* cited by examiner

*Primary Examiner* — Hai L Nguyen
(74) *Attorney, Agent, or Firm* — Sterne, Kessler, Goldstein & Fox P.L.L.C.

(57) ABSTRACT

Methods and apparatuses for high rotation rate low I/O count phase interpolation are disclosed, including techniques to reduce redundant phase interpolation coding and method steps by modifying phase mapping and generation with pluralities of amplifiers. I/O reduction count is achieved while maintaining resolution and allowing scalability in phase interpolation. Control circuits include techniques to interpolate phases at a high rotation rate while reducing discontinuities and risk for logic hazards.

20 Claims, 6 Drawing Sheets

APPARATUS FOR HIGH ROTATION RATE LOW I/O COUNT PHASE INTERPOLATOR

BACKGROUND

1. Field of the Disclosure

The disclosure generally relates to phase interpolators, and more specifically to techniques to reduce I/O count and redundant coding in a phase interpolator.

2. Related Art

Recent digital communication standards impose demanding jitter tolerance that requires the use of phase interpolators with high rotation rates and high resolutions. Conventional phase interpolators, including digital control, may include digital control words utilizing thermometer coding schemes addressing each phase individually. Such coding schemes may include Gray coding between adjacent phases allowing single bit changes between adjacent phases, thus allowing high rate phase rotation while avoiding discontinuities due to race hazards within digital control circuits, especially in pipelined and look-ahead applications. Unfortunately, systems addressing individual phases suffer from excessive control word length as the number of available phases increase to provide high resolution, driving high I/O count requirements on phase interpolators, impacting circuit layout, packaging, signal integrity, and PCB layout. Thus, phase interpolators that employ optimized coding schemes that reduce I/O count and control word length, while still providing high resolution, and allowing high rate phase rotation, may provide significant advantages.

To reduce I/O count and control word length, some exemplary systems employ quadrant-based phase interpolator control schemes that partition a full 360 degrees of phase rotation into four 90-degree quadrants to reduce I/O count and control word length from a directly addressed scheme. Two bits address each quadrant and a plurality of thermometer encoded bits, depending on the resolution, address intermediate phases and relative phase strengths within each of the four quadrants. Thus, in an exemplary embodiment wherein each quadrant contains four bits of resolution, a total of six bits encode a full 360 degrees of phase rotation, including 16 separate phases. This scheme is a significant improvement over, for example, a directly addressable scheme that would require a full 16 thermometer encoded bits to address 16 separate phases. A plurality of on-off amplifiers, addressed by the thermometer encoded bits within a given quadrant, amplify a selected two 90-degree adjacent phases at 0, 90, 180, and 270 degrees. Unfortunately, this scheme suffers from redundant encoding at 0, 90, 180, and 270 degrees, requiring an additional coding step during phase rotation, introducing delay and race hazards into control circuitry that may give rise to undesirable and unpredictable discontinuities.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 1:
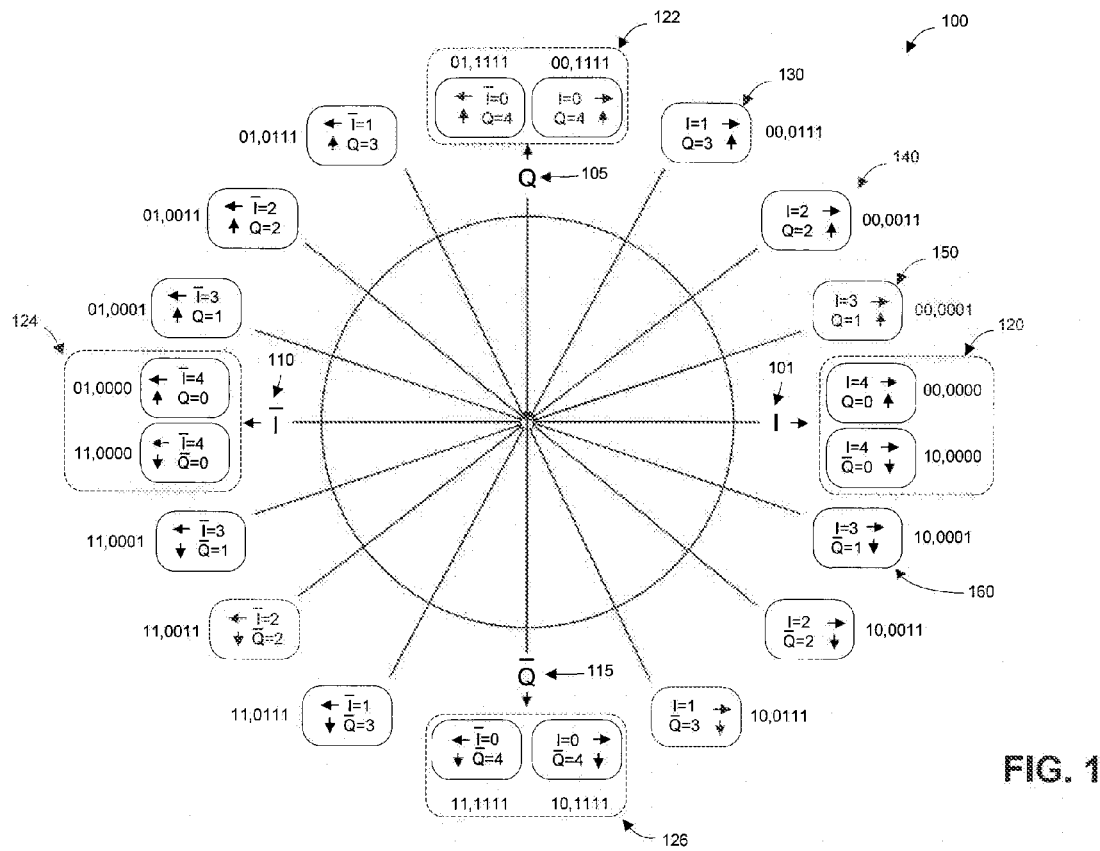
FIG. 1 illustrates a phase diagram illustrating a phase encoding and amplifier control scheme according to an exemplary embodiment of the present disclosure.

Embodiments of the disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

FIG. 1 illustrates a phase diagram 100 with a phase rotation encoding scheme to control a plurality of signal amplifiers to generate a plurality of interpolated phases from a provided in-phase 101, quadrature 105, anti-phase 110, and anti-quadrature 115 components of a signal. While the phase diagram 100 illustrates sixteen phases separate phases, other embodiments may comprise any number of phases while remaining within the spirit of the disclosure. The in-phase 101 and quadrature 105 components are 90 degrees out of phase with one another, the in-phase 101 and anti-phase 110 components are 180 degrees out of phase with one another, and the quadrature 105 and anti-quadrature 115 components are 180 degrees out of phase with one another. In some embodiments, series delay elements may generate the quadrature 105, anti-phase 110, and anti-quadrature phases 115 from a single in-phase 101 source signal. To generate an interpolated phase, for example, between a phase angle of an in-phase 101 component and a quadrature 105 component, the in-phase 101 component of the signal is amplified a particular proportion in comparison with the quadrature 105 component of the signal. In some embodiments, amplification may include current amplification of a signal, while in other embodiments amplification may include voltage amplification of a signal. A phase mixer combines the separately amplified in-phase 101 and quadrature 105 components of the signal to generate a signal with a phase angle representative of the proportion of the signal strength between the in-phase 101 and quadrature 105 components of the signal.

For example, as illustrated on phase state 130 of the phase diagram 100, one unit amplifier or driver amplifies the in-phase 101 component and three unit amplifiers or drivers amplify the quadrature 105 component to generate a signal with a phase angle 67.5 degrees out of phase with the in-phase 101 component. Using thermometer coding, as illustrated in phase state 130, "00" represents the quadrant wherein the in-phase 101 and quadrature 105 components are active, and "0111" represents one active in-phase amplifier, three inactive in-phase amplifiers, three active quadrature amplifiers, and one inactive quadrature amplifier. Likewise, in the adjacent phase state 140 of the phase diagram 100, "00" represents the quadrant wherein the in-phase 101 and quadrature 105 components are active, and "0011" represents two active in-phase amplifiers, two inactive in-phase amplifiers, two active quadrature amplifiers, and two inactive quadrature amplifiers. Such thermometer coding and Grey-coding between adjacent phases allows rapid changes between adjacent phases and simplified digital control circuits free of hazards and race conditions. For example, the gray and thermometer coding enable single bit changes between phase states, except at the quadrant boundaries.

The phase diagram 100 illustrates phase states directly on the in-phase 101, quadrature 105, anti-phase 110, and anti-quadrature 115 component, respectfully, phase states 120, 122, 124, and 126. Each respective phase state 120, 122, 124, and 126, illustrates redundant encoding due to the transition between quadrants, and the nature of the amplifier control. For example, in phase state 120, lying directly on the in-phase component 101, contains dual redundant states or coding, with coding for both quadrant 00, wherein the in-phase and quadrature components are active, and quadrant 10 wherein the in-phase and anti-quadrature components are active. In both phase states, all four in-phase amplifiers are activated, zero in-phase amplifiers are deactivated, and all four quadrature and anti-quadrature amplifiers are deactivated. As such, because the quadrature 105 and anti-quadrature 115 components are switched, and all the respective amplifiers are deactivated, the phase state 120 remains stationary, and two separate codes represent the same location or phase state on the phase diagram 100. Similar dual redundant states exist in phase states 122, 124, and 126 for similar reasons. Unfortunately, such dual redundant states present additional coding steps to that need to be traversed, thereby slowing phase shift speed. For example, if a phase rotation traverses from phase state 150 to phase state 160, then the necessary control coding changes from "00,0000" to "10,0000" at the intervening phase state 120, but no actual phase shift occurs on the phase diagram because of this coding change. These redundant code states are repeated at the other quadrant boundaries, as show. Furthermore, redundant steps, such as illustrated in phase state 120, introduce possible hazards into the digital control logic, wherein a race condition may occur and cause a discontinuous phase shift.

Figure 2:
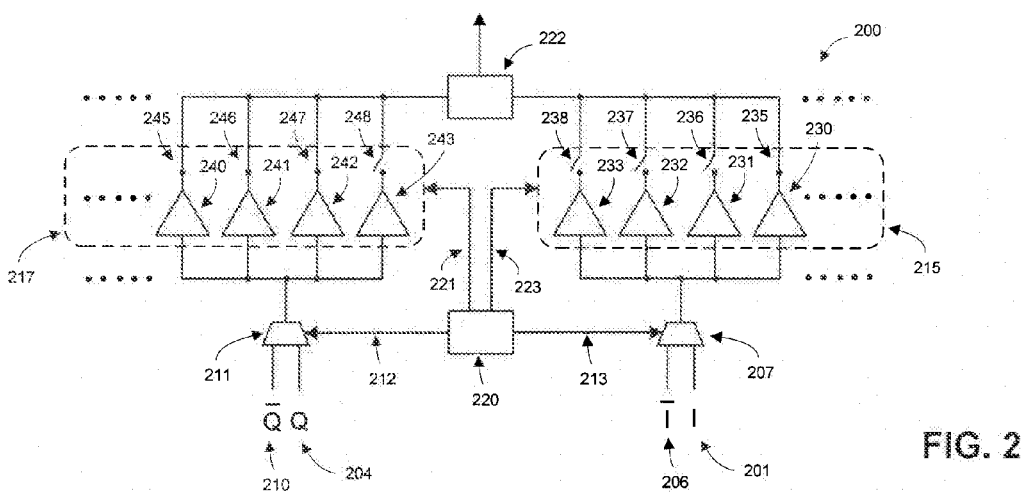
FIG. 2 illustrates a block diagram of a phase encoding and amplifier control and phase interpolation circuit according to an exemplary embodiment of the present disclosure.

FIG. 2 illustrates an exemplary embodiment of a phase encoding and amplifier control circuit 200 that may correspond to the phase diagram 100 illustrated in FIG. 1. The circuit 200 includes a selector 207 that receives in-phase 201 and anti-phase 206 components of a signal. Likewise, the circuit 200 includes selector 211 that receives quadrature 204 and anti-quadrature 210 components the signal. A digital control circuit 220 provides component selection signals 212 and 213 to the respective selectors 211 and 207, so as to determine the selected components that are to be coupled to a first plurality of amplifiers 217 and a second plurality of amplifiers 215. The digital control circuit 220 may, in some embodiments, comprise a processor with coupled memory containing executable instructions, a field-programmable gate array (FPGA) with hardcoded or reprogrammable logic configuration, or an application specific integrated circuit (ASIC).

The first plurality 217 and second plurality 215 of amplifiers, illustrated as including four amplifiers each, may include in other embodiments any number of amplifiers in either the first or second plurality of amplifiers. The first 217 and second 215 pluralities of amplifiers receive, for example, thermometer coded amplifier activation signals 221 and 223 from the digital control circuit 220. The amplifier control signals 221 and 223 may correspond to the thermometer encoding illustrated in FIG. 1, and the component selection signals 212 and 213 may correspond to the quadrant selections illustrated in FIG. 1. The first 217 and second 215 plurality of amplifiers may feed a phase mixer 222 that combines the separately amplified components into a single phase interpolated signal.

Each of the first 217 and second 215 plurality of amplifiers may receive an individual activation or deactivation signal that, for example opens or closes a switch in series with an amplifier input or output, or other embodiments, removes a source voltage from a bias node of an amplifier. In some embodiments, one particular switch 245 in series with an amplifier 240 in the first plurality of amplifiers 217 may have an opposite polarity with a corresponding switch 238 in series with an amplifier 233 in the second plurality of amplifiers 215. In one exemplary embodiment, one activation signal may address both switches 245 and 238 of opposite polarity, ensuring when one switch is open the other switch is closed, and vice versa. In other words, switches 245 and 238 form a pair of switches, and are controlled so that only one of the pair is closed at a time. This can be repeated for the other pairs of corresponding switches in the first 217 and second 215 plurality of amplifiers, so that only one switch in a pair is closed at any given time. In another exemplary embodiment, the amplifier selection signals 221 and 223 may traverse a single shared data bus with thermometer encoding corresponding to the illustrated coded phase states in FIG. 1.

The illustrated positions, in FIG. 1, of the switches in the first 217 and second 215 pluralities of amplifiers may correspond to the encoding illustrated in phase state 130 of the phase diagram 100 of FIG. 1. For example, the digital control circuit 220 may generate component selection signal 213 to instruct the selector 207 to couple the in-phase component 201 to the second plurality of amplifiers 215. Likewise, the digital control circuit 220 may generate component selection signal 212 to instruct selector 211 to couple the quadrature component 204 to the first plurality of amplifiers 217. Phase state 130 of FIG. 1, coded as "0111" may correspond to the closed position of switches 245, 246, and 247, and may correspond to the open position of switch 248. The open position of switches 238, 237, and 236 and closed position of 235, having opposite polarity of switches 245, 246, 247, and 248, likewise may correspond to phase state 130, coded as "0111" in FIG. 1. The first plurality of amplifiers 217 may amplify the quadrature component 204, for example, by three units if the amplifiers provide identical amplification, and the second plurality of amplifiers may amplify the in-phase component 201 by one unit. The output of the first plurality 217 and second plurality 215 may sum in the phase mixer to generate a signal 67.5 degrees out of phase with the in-phase component 201. As such, the effect of the individual switch control in the amplifiers 217 and 215 is to weight the amount of I and Q components that are ultimately summed in phase mixer 222, thereby determining the phase state on the phase diagram 100. In other embodiments, the first plurality of amplifiers 217 and/or the second plurality of amplifiers 215 may each include a single amplifier with adjustable amplification that adjusts over a plurality of levels in response to the amplifier select signals 221 and 223 respectfully.

The circuit 200 includes the dual redundant states at phase states 120, 122, 124, and 126 in FIG. 1 directly at the in-phase, quadrature, anti-phase, and anti-quadrature components. For example, at phase state 122 in FIG. 1 two different coding states of the circuit 200 may occur, "00,1111" and "01,1111". The first state, "00,1111" instructs the digital control circuit 220 to generate component select signal 213 to couple the in-phase component 201 in the selector 207 to the second plurality of amplifiers 215. Likewise, "00,1111" instructs the digital control circuit 220 to generate component select signal 212 to couple the quadrature component 204 in the selector 211 to the first plurality of amplifiers 217. The digital control circuit 220 generates amplifier control signals to open all of switches 235-238, and close all of switches 245-248, thus passing only the quadrature component to the phase mixer 222. The second redundant state, "01,1111" causes the digital control circuit 200 to couple the anti-in-phase component 206 to the second plurality of amplifiers 215 in the selector 207. The state of the switches 235-238 and 245-248 do not change during this transition. Thus, the phase of the signal generated by the phase mixer 222 does not change. Similar dual redundant states exist, for example, at phase states 120, 124, and 126 in FIG. 1 with similar effects on the circuit 200.

The circuit 200, when shifting among, for example, the adjacent phases represented by phase states 150, 120, and 160 in FIG. 1, suffers from traversing the dual redundant state at phase state 120, traversing two states ("00,0000" and "10, 0000") without shifting phase. As discussed above, traversing such dual redundant states introduces delay into the shift process, and may introduce race conditions in the digital control circuit 220. Such dual redundant states are a result of states lying directly on the in-phase, quadrature, anti-phase, and anti-quadrature component, requiring coupling a separate component, for example with the component selectors 211 or 207, to one of the plurality of amplifiers 217 or 215, with no corresponding phase shift. Coupling a separate component with the circuit 200 simultaneously with activation or deactivation of at least of the plurality of amplifiers may result in a discontinuity wherein the component switches prior to the amplifier deactivation or activation, resulting in a positive shift forward two states, and backwards one state. Such discontinuities may result, for example, in loss of tracking of a rapidly changing embedded clock signal, and thus lost data due to an unstable receiver clock.

Figure 3:
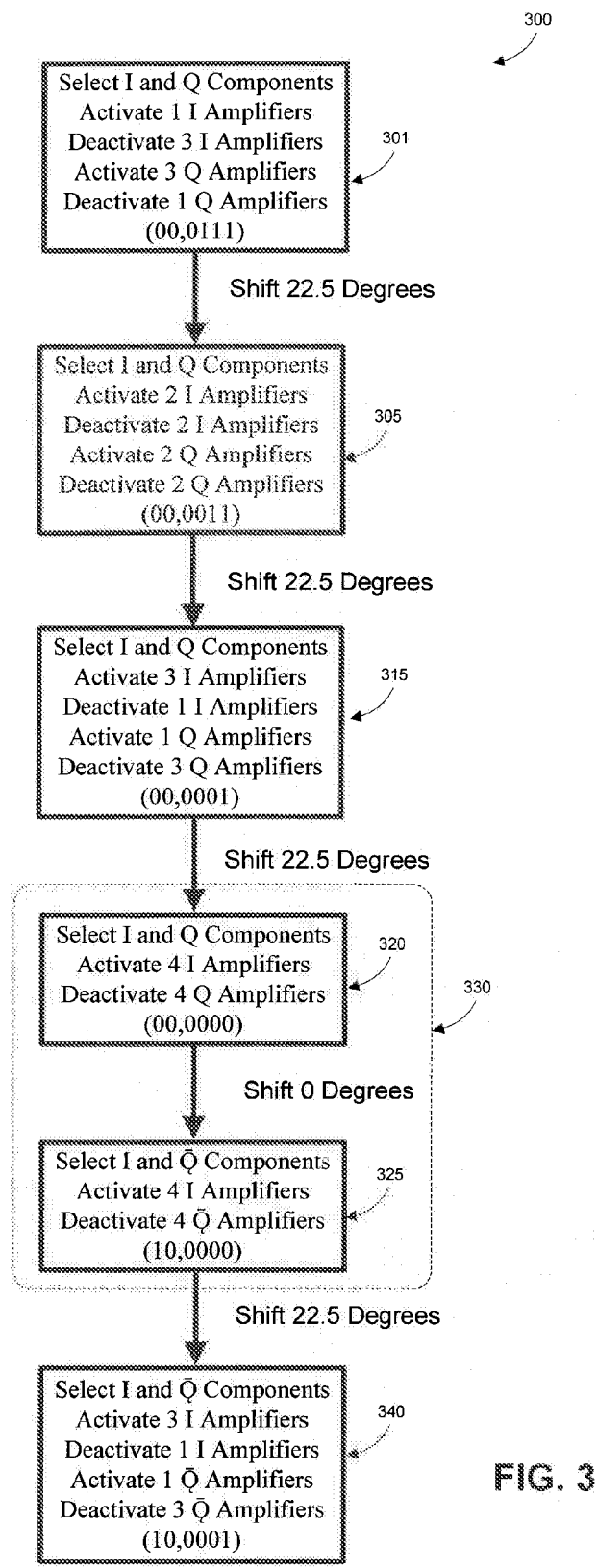
FIG. 3 illustrates a flowchart of operational steps to control a plurality of amplifiers to rotate the phase of a signal according to an exemplary embodiment of the present disclosure.

FIG. 3 illustrates a flowchart 300 of operational steps to control a plurality of amplifiers to rotate the phase of a signal. The flowchart illustrated in FIG. 3 references the exemplary embodiments illustrated in FIGS. 1 and 2, however, the exemplary embodiments illustrated in FIGS. 1 and 2 do not limit the exemplary method steps illustrated in flowchart 300. As such, the order of method steps illustrated in flowchart 300, in some embodiments, may execute in alternative orders, or in other embodiments, execute simultaneously while remaining within the scope and spirit of the disclosure.

The flowchart 300 illustrates exemplary operational steps to rotate the phase of a signal a total of 90 degrees, for example from phase state 130 to phase state 160 in FIG. 1, in six separate steps each comprising separate coding for component selection and amplifier control signals. The flowchart 300 includes step 301, wherein, for example, the digital control circuit 220, in response to coding "00,0111", commands selectors 211 and 207 to couple the quadrature and in-phase components to the first plurality 217 and second plurality 215 of amplifiers respectfully. Likewise, the digital control circuit 220, for example, in response to coding "00,0111", activates three amplifiers and deactivates one amplifier in the first plurality of amplifiers 217, and activates one amplifier and deactivates three amplifiers in the second plurality of amplifiers 215. Step 301 may correspond to phase state 130 of FIG. 1.

Transitioning from step 301 to step 305 in the flowchart 300 shifts the phase of the output signal of the circuit 200 by 22.5 degrees, for example, from phase state 130 to phase state 140 of FIG. 1. The digital control circuit 220, in response to coding "00,0011" activates two amplifiers and deactivates two amplifiers in the first plurality of amplifiers 217, and activates two amplifiers and deactivates two amplifiers in the second plurality of amplifiers 215. The digital control circuit 220 continues to command selectors 211 and 207 to couple the quadrature and in-phase components to the first plurality 217 and second plurality 215 of amplifiers respectfully. As such, the phase of the output signal of the circuit 200, for example, shifts 22.5 degrees. It is notable that only one amplifier in each of the plurality of amplifiers 217 and 215 actually had to change in order to effect the phase shift, reflecting the single bit shift in the coding state from "00,0111" to "00, 0011."

Likewise, transitioning from step 305 to step 315 in the flowchart 300 shifts the phase of the output signal of the circuit 200 by 22.5 degrees, for example, from phase state 140 to phase state 150 of FIG. 1. The digital control circuit 220, in response to coding "00,0001" activates one amplifier and deactivates three amplifiers in the first plurality of amplifiers 217, and activates three amplifiers and deactivates one amplifier in the second plurality of amplifiers 215. The digital control circuit 220 continues to command selectors 211 and 207 to couple the quadrature and in-phase components to the first plurality 217 and second plurality 215 of amplifiers respectfully. As such, the phase of the output signal of the circuit 200, for example, shifts 22.5 degrees. Again, it is notable that only one amplifier in each of the plurality of amplifiers 217 and 215 actually had to change in order to effect the phase shift, reflecting the single bit shift in the coding state from "00,0011" to "00,0001."

Step 320 shifts the phase of the output signal of the circuit 200 by 22.5 degrees, for example, from phase state 150 to phase state 120 of FIG. 1. The digital control circuit 220, in response to coding "00,0000" deactivates all amplifiers in the first plurality of amplifiers 217, and activates all amplifiers in the second plurality of amplifiers 215. The digital control circuit 220 continues to command selectors 211 and 207 to couple the quadrature and in-phase components to the first plurality 217 and second plurality 215 of amplifiers respectfully. Again, it is notable that only one amplifier in each of the plurality of amplifiers 217 and 215 actually had to change in order to effect the phase shift, reflecting the single bit shift in the coding state from "00,0001" to "00,0000."

To shift the phase of the output signal of the circuit 200 of FIG. 2 from phase state 120 to phase state 160 of FIG. 1, the digital control circuit 220 executes intermediate step 325 to switch the quadrature component to the anti-quadrature component. In step 325 the digital control circuit 220 of FIG. 2, in response to coding "10,0000" continues to deactivate all amplifiers in the first plurality of amplifiers 217, and continues to activate all amplifiers in the second plurality of amplifiers 215. However, the digital control circuit 220 commands selectors 211 to couple the anti-quadrature component to the first plurality 217 while continuing to command the selector 207 couple the in-phase component to the second plurality 215 of amplifiers. Thus, no phase shift of the output of the circuit 200 occurs at step 325, and the two steps 320 and 325 form a dual redundant step 330, corresponding, for example, with phase state 120 of FIG. 1. Here, it is notable that no amplifier in each of the plurality of amplifiers 217 and 215 actually had to change state, even though there was a bit shift in the coding state from "00,0000" to "10,0000."

At step 340 the digital control circuit 220 of FIG. 2, in response to coding "10,0001" activates one amplifier and deactivates three amplifiers in the first plurality of amplifiers 217, and activates three amplifiers and deactivates one amplifier in the second plurality of amplifiers 215. The digital control circuit 220 continues to command selectors 211 and 207 to couple the anti-quadrature and in-phase components to the first plurality 217 and second plurality 215 of amplifiers respectfully. As such, the phase of the output signal of the circuit 200, for example, shifts 22.5 degrees, for a total of 90 degrees from step 301 to step 340. Again, it is notable that only one amplifier in each of the plurality of amplifiers 217 and 215 actually had to change in order to effect the phase shift of 22.5 degrees, reflecting the single bit shift in the coding state from "10,0000" to "10,0001."

Figure 4:
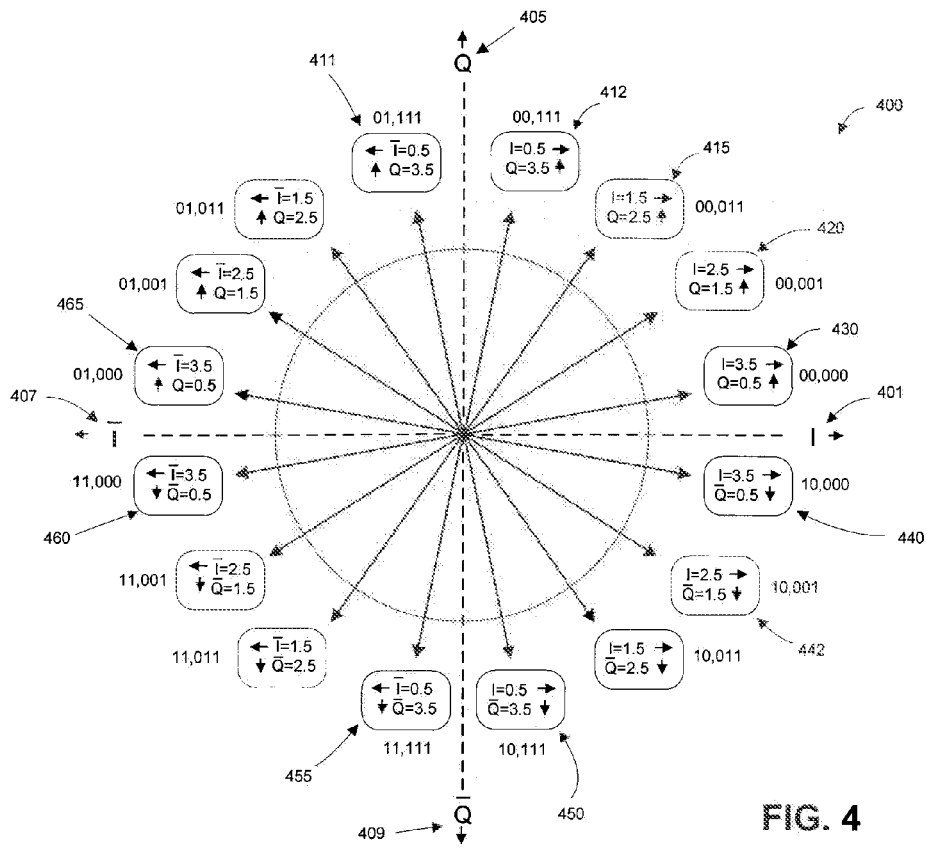
FIG. 4 illustrates a phase diagram illustrating a phase encoding and amplifier control scheme according to an exemplary embodiment of the present disclosure.

FIG. 4 illustrates a phase diagram 400 with a phase rotation encoding scheme to control a plurality of signal amplifiers to generate a plurality of interpolated phases from a provided in-phase 401, quadrature 405, anti-phase 407, and anti-quadrature 409 components of a signal without dual redundant coding and with reduced I/O count. While the phase diagram 400 illustrates sixteen phases separate phases, other embodiments may comprise any number of phases while remaining within the scope and spirit of the disclosure. The in-phase 401 and quadrature 405 components are 90 degrees out of phase with one another, the in-phase 401 and anti-phase 407 components are 180 degrees out of phase with one another, and the quadrature 405 and anti-quadrature 409 components are 180 degrees out of phase with one another. In some embodiments, series delay elements may generate the quadrature 405, anti-phase 407, and anti-quadrature phases 409 from a single in-phase 401 source signal. The delay element can be a metal trace on an integrated or discrete reactive components, tuned to provide the desired delay the determined frequency. To generate an interpolated phase, for example between a phase angle of an in-phase 401 component and a quadrature 405 component, the in-phase 401 and quadrature 405 components are amplified by a constant or fixed magnitude irrespective of the desired phase angle, in addition to the in-phase 401 component of the signal being amplified by an additional particular proportion in comparison with the quadrature 405 component of the signal. A phase mixer combines the separately amplified in-phase 401 and quadrature 405 components of the signal to generate a signal with a phase angle representative of the proportion of the signal strength between the in-phase 401 and quadrature 405 components of the signal.

For example, as illustrated on phase state 420 of the phase diagram 400, one half unit amplifier or driver amplifies both the in-phase 401 and quadrature 405 components, and has half the amplification as the other whole unit amplifiers. In addition, two unit amplifiers amplify the in-phase 401 component (for a total of I=2.5 units), and one unit amplifier amplifies the quadrature 405 component (for a total of Q=1.5 units) so as to generate a signal with a phase angle 33.75 degrees out of phase with the in-phase 401 component. Using thermometer coding, as illustrated in phase state 420, "00" represents the quadrant wherein the in-phase 401 and quadrature 405 components are active and each amplified with one half unit amplifier, and "001" represents two active one unit in-phase amplifiers, one inactive one unit in-phase amplifier, one active one unit quadrature amplifier, and two inactive one unit quadrature amplifiers. Likewise, in the adjacent phase state 430 of the phase diagram 400, "00" represents the quadrant wherein the in-phase 401 and quadrature 405 components are active and each amplified with one half unit amplifier. The remaining coding "000" in phase state 430 represents three active one unit in-phase amplifiers, zero inactive one unit in-phase amplifiers, zero active one unit quadrature amplifiers, and three inactive one unit quadrature amplifiers. Such thermometer coding and Grey-coding between adjacent phases allows rapid changes between adjacent phases and simplified digital control circuits free of hazards and race conditions.

The phase diagram 400 illustrates that no phase states lie directly on the in-phase 401, quadrature 405, anti-phase 407, and anti-quadrature 409 components, in contrast with the phase diagram 100 of FIG. 1. The illustrated half phase shift, achieved as a result of constantly activated half unit amplifier for each quadrant, both eliminates the dual redundant coding illustrated in FIG. 1 and reduces the number of thermometer encoded bits, and as a result the I/O count required to address each of the plurality of amplifiers for each signal component. Such elimination of redundant coding and reduction of thermometer encoded bits does not however reduce the number of available phases, remaining at 16 total phases, the same number of phases included in the embodiment illustrated in FIG. 1. As a consequence of the elimination of redundant coding, the embodiment illustrated in FIG. 4 may rotate among phases more quickly and without discontinuities as a result of not traversing redundant coding. Furthermore, digital control circuits implementing the embodiment illustrated in FIG. 4 may avoid possible hazards into the digital control logic, wherein a race condition may occur and cause a discontinuous phase shift.

For example, phase states 430 and 440, lying adjacent of the in-phase component 401, while sharing amplifier control signal coding "000" are traversed in one coding step by changing component select signal from "00" to "10" resulting in a 22.5 degree shift. As a comparison, referring back to FIG. 1, two coding steps were required to traverse phase state 120. Similar traversing exists between phase states 411 and 412, phase states 460 and 465, and phase states 450 and 455. As a result of the coding scheme illustrated in FIG. 4, each grey coded bit transition results in a 22.5 degree shift, and does so with one less bit in the coding, resulting in a lower I/O count to each plurality of amplifiers. In other words, the coding scheme in FIG. 4 requires only 5 coding bits for 16 phase states, whereas that of FIG. 1 required 6 coding bits for the same number of phase states. It will be further noticed that the coding scheme of FIG. 4 has the effect of rotating each of the phase states counter clockwise by one-half a phase state, relative to corresponding phase states provided in FIG. 1. For example, phase state 412 (coding state 00,111) no longer lies on the Q-axis 405, but is instead shifted counter clock-wise by one-half a phase state, or 11.25 degrees in this instance.

Figure 5:
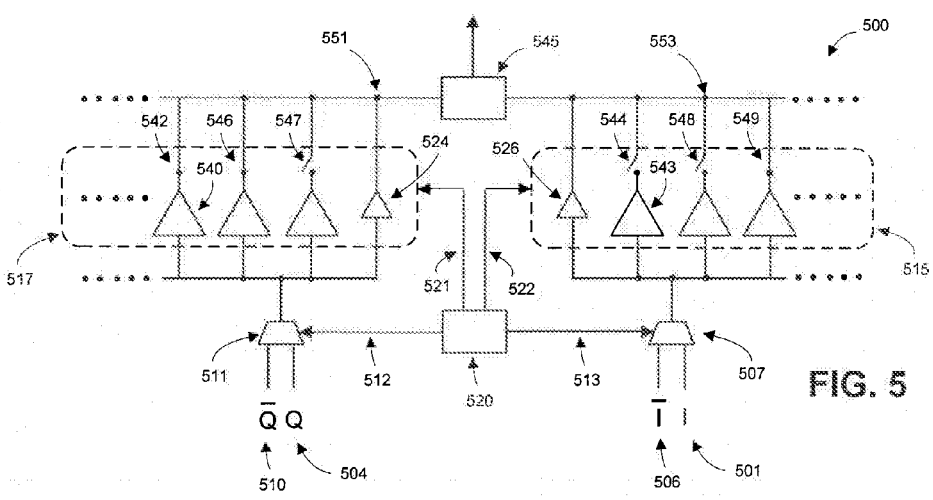
FIG. 5 illustrates a block diagram of a phase encoding and amplifier control and phase interpolation circuit according to an exemplary embodiment of the present disclosure.

FIG. 5 illustrates a block diagram of a phase encoding and amplifier control and phase interpolation circuit, corresponding in some embodiments of the phase diagram 400 of FIG. 4. The circuit 500 includes a selector 507 that receives in-phase 501 and anti-phase 506 components of a signal, such as a clock signal. Likewise, the circuit 500 includes a selector 511 that receives quadrature 504 and anti-quadrature 510 components of the signal. A digital control circuit 520 provides component selection signals 512 and 513 to the respective selectors 511 and 507, so as to determine the selected components that are to be coupled to a first plurality of amplifiers 517 and a second plurality of amplifiers 515. The digital control circuit 520 may, in some embodiments, comprise a processor with coupled memory containing executable instructions, a field-programmable gate array (FPGA) with hardcoded or reprogrammable logic configuration, or an application specific integrated circuit (ASIC). The first plurality 517 and second plurality 515 of amplifiers, illustrated as including four amplifiers each, may include in other embodiments any number of amplifiers in either the first or second plurality of amplifiers. The first 517 and second 515 pluralities of amplifiers receive, for example, thermometer coded amplifier activation signals 521 and 522 respectively from the digital control circuit 520. The amplifier control signals 521 and 522 may correspond to the thermometer encoding illustrated in FIG. 4, and the component selection signals 512 and 513 may correspond to the quadrant selections illustrated in FIG. 4. The first 517 and second 515 plurality of amplifiers may each include three one unit amplifiers (e.g. 540) providing substantially the same amount of amplification, and one half unit amplifier (e.g. 524) providing approximately one half the amplification of the other three (whole) unit amplifiers. The first 517 and second 515 pluralities of amplifiers feed a phase mixer 545 that combines the separately amplified components into a single phase interpolated signal.

Each of the one unit amplifiers in the first 517 and second 515 plurality of amplifiers may receive an individual activation or deactivation signal that, for example opens or closes a switch in series with an amplifier input or output, or in other embodiments, removes a source voltage from a bias node of an amplifier. The single one half unit amplifiers 524 and 526 in the first 517 and second 515 pluralities of amplifiers are constantly activated, regardless of target phase state. Therefore, at least one half unit of amplification is provided for both I and Q. In some embodiments, one particular switch 542 in series with an amplifier 540 in the first plurality of amplifiers 517 may have an opposite polarity with a corresponding switch 544 in series with an amplifier 543 in the second plurality of amplifiers 515. In one exemplary embodiment, one activation signal may address both switches 542 and 544 of opposite polarity, ensuring when one switch is open the other switch is closed, and vice versa. In other words, switches 542 and 544 form a pair of switches, and are controlled so that only one of the pair is closed at a time. This can be repeated for the other pairs of corresponding switches in the first 517 and second 515 plurality of amplifiers, so that only one switch in a pair is closed at any given time. In another exemplary embodiment, the amplifier selection signals 521 and 522 may traverse a single shared data bus with thermometer encoding corresponding to the illustrated coded phase states in FIG. 4.

Still referring to FIG. 5, the outputs of the one-unit amplifiers 540 and the half unit amplifier 524 in the first plurality of amplifiers 517 are summed at a summing node 551. Likewise, the outputs of the one-unit amplifiers 543 and the half unit amplifier 526 in the second plurality of amplifiers 515 are summed at a summing node 553. The summing nodes 551 and 553 may be a single summing node integrated in phase mixer 545. Further, the first plurality of amplifiers 517 may be referred to herein as an quadrature amplifier circuit or block having the plurality of switchable component amplifiers 540 and the half unit amplifier 524, operating on one of quadrature signals 510 or 504. Likewise, the second plurality of amplifiers 515 may be referred to herein as an in-phase amplifier circuit or block having the plurality of switchable component amplifiers 543 and the half unit amplifier 526, operating on one of in-phase signals 506 or 501.

The illustrated positions of the switches in the first 517 and second 515 pluralities of amplifiers may correspond to the encoding illustrated in phase state 415 of the phase diagram 400 of FIG. 4. For example, the digital control circuit 520 may generate component selection signal 513 to instruct the selector 507 to couple the in-phase component 501 to the second plurality of amplifiers 515. Likewise, the digital control circuit 520 may generate component selection signal 512 to instruct selector 511 to couple the quadrature component 504 to the first plurality of amplifiers 517. Phase state 415 of FIG. 4, coded as "011" may correspond to the closed position of switches 542 and 546, and may correspond to the open position of switch 547. The open position of switches 544 and 548, and closed position of 549, having opposite polarity of switches 542, 546, and 547, likewise correspond to phase state 415, coded as "011" in FIG. 4. The first plurality of amplifiers 517 may amplify the quadrature component 504, for example, by two and one half units, and the second plurality of amplifiers may amplify the in-phase component 501 by one and one half unit. The constantly activated one half unit amplifiers 526 and 524 provide the additional one half unit amplification for the in-phase 501 and quadrature 504 components, respectively. The output of the first plurality 517 and second plurality 515 may sum in the phase mixer to generate a signal 56.25 degrees out of phase with the in-phase component 501. In other embodiments, the first plurality of amplifiers 517 and/or the second plurality of amplifiers 515 may each include a single amplifier with adjustable amplification that adjusts over a plurality of levels in response to the amplifier select signals 521 and 522 respectfully, however, for example, constantly providing an additional one half unit amplification bias for all phase states. In other embodiments, one single adjustable amplifier may replace the one unit amplifiers, and the one half unit amplifiers may remain separate and constantly activated.

The circuit 500, when shifting among, for example, the adjacent phases represented by phase states 430 and 440 in FIG. 4, does not suffer from traversing a dual redundant code, such as the dual redundant code represented as phase state 120 in FIG. 1. As such, the digital control circuit 520 need not introduce additional delay or steps to traverse from phase state 430 to 440. Traversing from phase state 430 to phase state 440 includes switching the input to the first 517 plurality of amplifiers from the quadrature 504 component to the anti-quadrature 510 component, resulting in a 22.5 degree shift. There is no redundant code state because the one half unit amplifier 524 remains constantly activated and subsequently switches from amplifying the quadrature 504 component to the anti-quadrature component 510 in a single step. Thus, the possibility for hazards generating discontinuities, for example as discussed above in circuit 200 in FIG. 2, are absent in the circuit 500. As such, the circuit 500 may adapt more quickly and predictably, for example, to a rapidly changing embedded clock signal, allowing predicable synchronous receiver data sampling.

Figure 6:
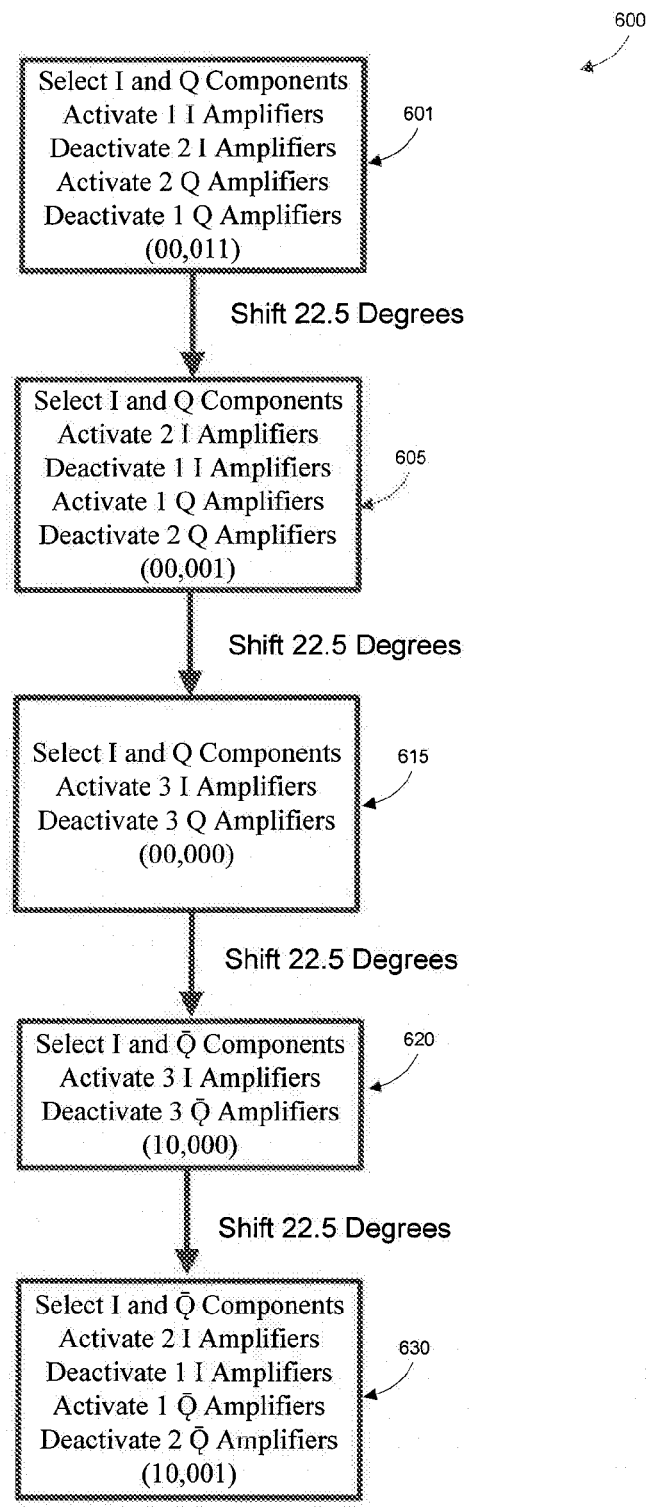
FIG. 6 illustrates a flowchart of operational steps to control a plurality of amplifiers to rotate the phase of a signal according to an exemplary embodiment of the present disclosure.

FIG. 6 illustrates a flowchart 600 of operational steps to control a plurality of amplifiers to rotate the phase of a signal.

The flowchart illustrated in FIG. 6 references the exemplary embodiments illustrated in FIGS. 4 and 5, however, the exemplary embodiments illustrated in FIGS. 4 and 5 do not limit the exemplary method steps illustrated in flowchart 600. As such, the order of method steps illustrated in flowchart 600, in some embodiments, may execute in alternative orders, or in other embodiments, execute simultaneously while remaining within the scope and spirit of the disclosure.

The flowchart 600 illustrates exemplary operational steps to rotate the phase of a signal a total of 90 degrees, for example from phase state 415 to phase state 442 in FIG. 4, in five separate steps each comprising separate coding for component selection and amplifier control signals. The flowchart 600 includes step 601, wherein, for example, the digital control circuit 520, in response to coding "00,011", commands selectors 511 and 507 to couple the quadrature and in-phase components to the first plurality 517 and second plurality 515 of amplifiers respectfully. The one half unit amplifiers 524 and 526 remain activated throughout the process 600, amplifying the component selected by the component selection signals 512 and 513 by one-half unit of amplification. Likewise, the digital control circuit 520, for example, in response to coding "00,011", activates two amplifiers and deactivates one amplifier in the first plurality of amplifiers 517, and activates one amplifier and deactivates two amplifiers in the second plurality of amplifiers 515. Step 601 may correspond to phase state 415 of FIG. 4.

Transitioning from step 601 to step 605 in the flowchart 600 shifts the phase of the output signal of the circuit 500 by 22.5 degrees, for example, from phase state 415 to phase state 420 of FIG. 4. The digital control circuit 520, in response to coding "00,001", continues to command selectors 511 and 507 to couple the quadrature and in-phase components to the first plurality 517 and second plurality 515 of amplifiers, respectfully. Further, the digital control circuit 520 activates one amplifier and deactivates two amplifiers in the first plurality of amplifiers 517, and activates two amplifiers and deactivates one amplifier in the second plurality of amplifiers 515 in response to coding "00,001." As such, the phase of the output signal of the circuit 500, for example, shifts 22.5 degrees from phase state 415 to phase state 420 of FIG. 4. It is notable that only one amplifier in each of the plurality of amplifiers 517 and 515 actually had to change in order to effect the phase shift, reflecting the single bit shift in the coding state from "00,011" to "00,001."

Likewise, transitioning from step 605 to step 615 in the flowchart 600 shifts the phase of the output signal of the circuit 500 by 22.5 degrees, for example, from phase state 420 to phase state 430 of FIG. 4. The digital control circuit 520, in response to coding "00,000" deactivates three amplifiers in the first plurality of amplifiers 517, and activates three amplifiers in the second plurality of amplifiers 515. The digital control circuit 520 continues to command selectors 511 and 507 to couple the quadrature and in-phase components to the first plurality 517 and second plurality 515 of amplifiers respectfully. As such, the phase of the output signal of the circuit 500, for example, shifts 22.5 degrees from phase state 420 to phase state 430 of FIG. 4. It is notable that only one amplifier in each of the plurality of amplifiers 517 and 515 actually had to change in order to effect the phase shift, reflecting the single bit shift in the coding state from "00,001" to "00,000."

Transitioning from step 615 to step 620 shifts the phase of the output signal of the circuit 500 by 22.5 degrees, for example, from phase state 430 to phase state 440 of FIG. 4. The digital control circuit 520, in response to coding "10,000" continues to deactivate three amplifiers in the first plurality of amplifiers 517, and continues to activate three amplifiers in the second plurality of amplifiers 515. The digital control circuit 520, however, commands selector 511 to couple the anti-quadrature component to the first plurality 517 of amplifiers while continuing to command selector 507 to couple the in-phase component to second plurality 515 of amplifiers. As such, because the one half unit amplifiers in both the first 517 and second 515 plurality of amplifiers remain activated throughout the process 600, the one half unit amplifier 524 changes from amplifying the quadrature component 504 to the anti-quadrature component 510, resulting in a 22.5 degree shift. Grey coding remains between steps 615 and 620 because only one component select bit changes from "00" to "10" coding. It is notable that no amplifier in each of the plurality of amplifiers 517 and 515 actually had to change state in order to effect the phase shift, even though there was a single bit shift in the coding state from "00,000" to "10, 000."

At step 630 the digital control circuit 520 of FIG. 5, in response to coding "10,001" activates one amplifier and deactivates two amplifiers in the first plurality of amplifiers 517, and activates two amplifiers and deactivates one amplifier in the second plurality of amplifiers 515. The digital control circuit 520 continues to command selectors 511 and 507 to couple the anti-quadrature and in-phase components to the first plurality 517 and second plurality 515. As such, the phase of the output signal of the circuit 500, for example, shifts 22.5 degrees, for a total of 90 degrees from step 601 to step 630, one less step than the process 300 in FIG. 3, thus allowing faster rotation in the embodiment illustrated in FIG. 6.

Figure 7:
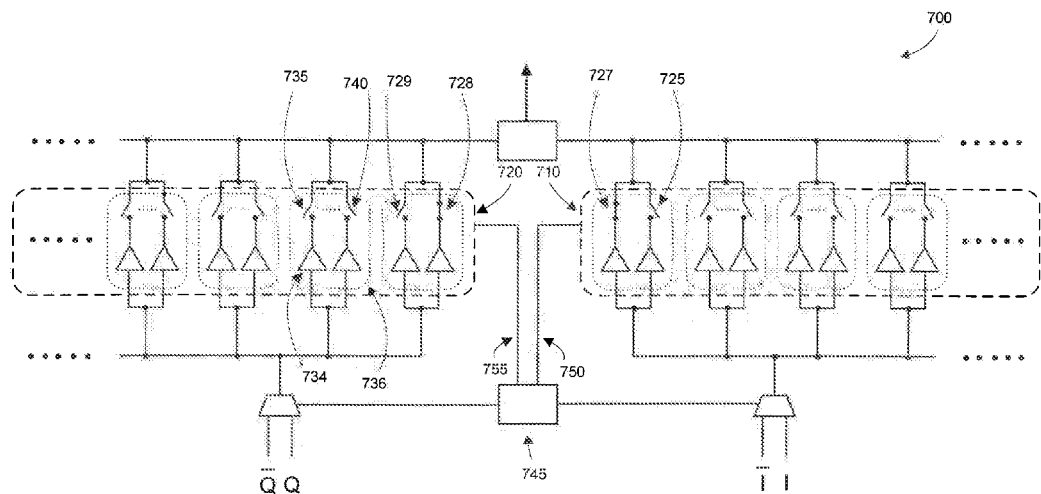
FIG. 7 illustrates a block diagram of a phase encoding and amplifier control and phase interpolation circuit according to an exemplary embodiment of the present disclosure.

FIG. 7 illustrates a phase encoding and amplifier control and phase interpolation circuit 700 according an exemplary embodiment of the disclosure. The circuit 700 may, in some embodiments, correspond to the embodiment illustrated in FIG. 5 without limiting the embodiments of FIG. 5. For example, the first plurality of amplifiers 720 may correspond to the first plurality of amplifiers 517, including any number of sets of amplifiers, and likewise the second plurality of amplifiers 710 may correspond to the second plurality of amplifiers 515. FIG. 7 includes similar components to FIG. 5, however, each unit amplifier (e.g. 540) may be replaced by two one half unit amplifiers 734, where each one half unit amplifier 734 provides half the amplification of the (whole) unit amplifier 540 from FIG. 5. Individual pairs of half unit amplifiers 734 have their inputs coupled together to receive I and Q input signals as in FIG. 5, and have their outputs coupled together through individually controlled switches 735 and 740, respectively, thus making each set 736 of half unit amplifiers equivalent to a one (whole) unit amplifier 540 of FIG. 5. The first 720 and second 710 pluralities of amplifiers continue to receive amplifier select signals from the digital control circuit 745 to rotate among phase states, for example, similar to the embodiment illustrated and described herein in FIGS. 4-5.

Further, one pair from the first 720 and second 710 pluralities of amplifiers may correspond to the one half unit amplifiers 524 and 526 of FIG. 5. Switches 729 and 725 may, for example, constantly remain open in a fixed non-switchable manner, and switches 728 and 727 may constantly remain closed in a fixed non-switchable manner, emulating the one half unit amplifiers 524 and 526 of FIG. 5 without requiring separate one unit and one half unit amplifiers. Thus, the circuit 700 may, in some embodiments convert functionality between the embodiment illustrated in FIG. 5 by configuring the digital control circuit 745 to provide independent control of switches 729, 728, 727, and 725, as described herein.

Figure 8:
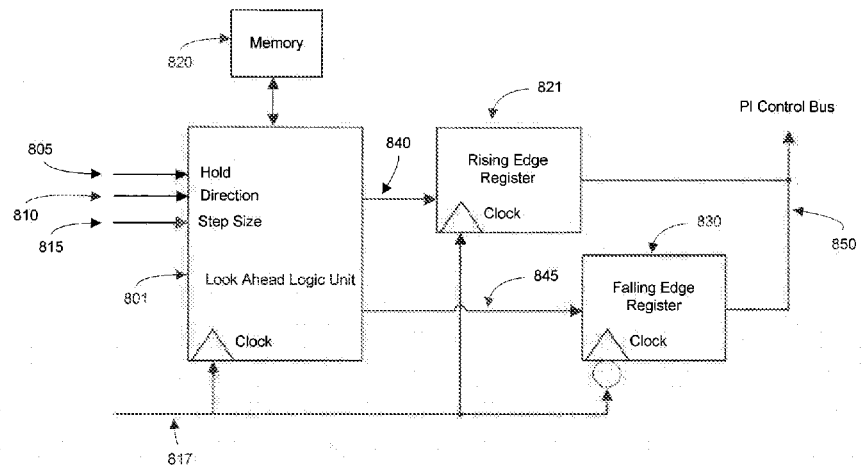
FIG. 8 illustrates a block diagram of a pipelined look-ahead amplifier control circuit according to an exemplary embodiment of the present disclosure.

FIG. 8 illustrates a block diagram of a pipelined look-ahead amplifier control circuit 800 according to an exemplary embodiment of the present disclosure. FIG. 8 includes a look ahead logic unit 801 that receives, for example, commands to hold position 805, a direction of phase shift 810, and a phase shift step size 815. The logic unit 801 subsequently looks up, for example from a memory 820, possible future commands, and outputs said future commands for execution on a rising edge and falling edge of a clock 817. A rising edge register 821 subsequently stores and provides phase interpolation commands 850 at a rising edge of a clock 817. Likewise, a falling edge register 830 subsequently stores and provides phase interpolation commands 850 at a falling edge of a clock 817. In some embodiments, the phase interpolation commands may correspond to commands executed by the digital control circuits 220, 520, and 745.

Figure 9:
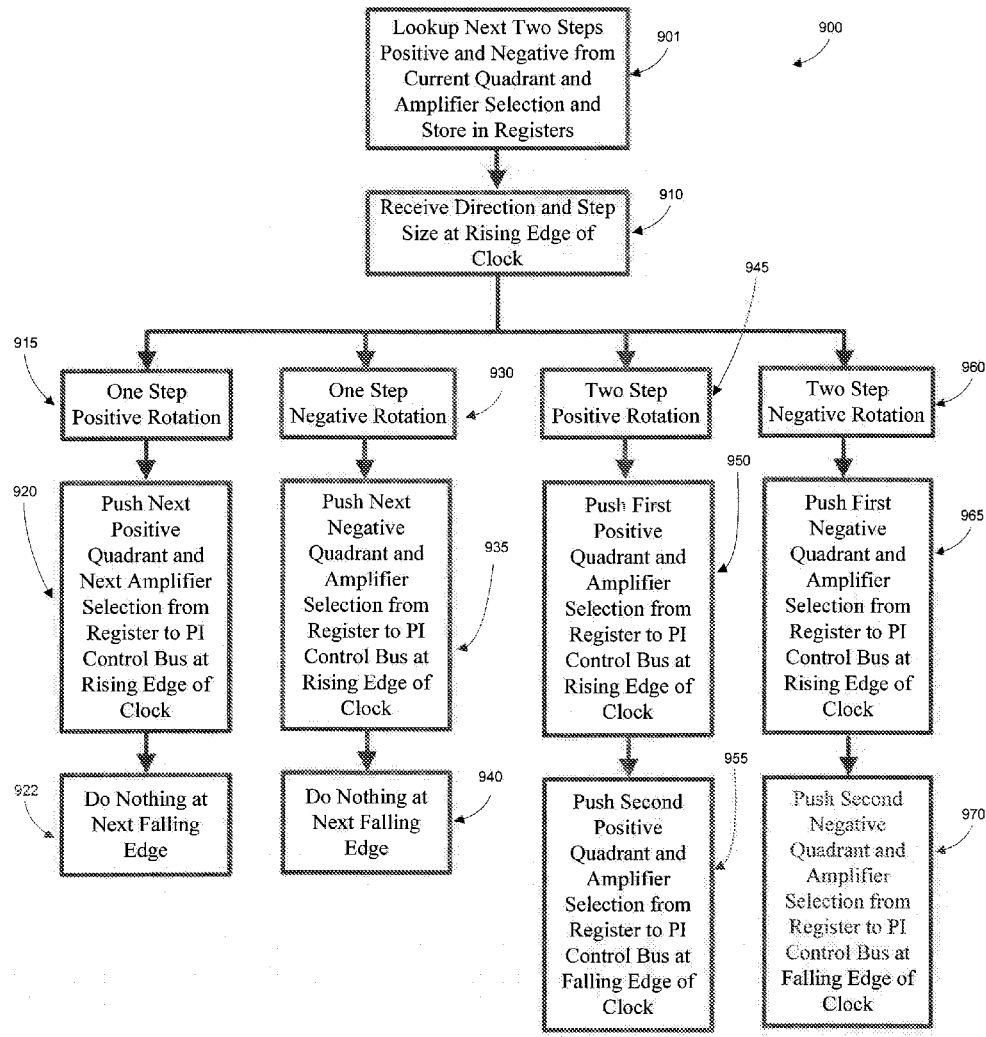
FIG. 9 illustrates a flowchart of operational steps to control a pipelined look-ahead amplifier control circuit according to an exemplary embodiment of the present disclosure.

FIG. 9 illustrates a flowchart 900 of operational steps to control a pipelined look-ahead amplifier control circuit according to an exemplary embodiment of the present disclosure. The flowchart illustrated in FIG. 9 references the exemplary embodiments illustrated in FIG. 8, however, the exemplary embodiment illustrated in FIG. 8 do not limit the exemplary method steps illustrated in flowchart 900. As such, the order of method steps illustrated in flowchart 900, in some embodiments, may execute in alternative orders, or in other embodiments, execute simultaneously while remaining within the scope and spirit of the disclosure.

The flowchart 900 includes step 901 wherein, for example, the logic unit 801 from FIG. 8 looks up the next two possible positive and negative steps from a memory 820, based on knowledge of the current phase. The logic unit 801 may push the next two possible steps to the rising edge register 821 that may occur on future rising edges of a clock 817. Likewise, the logic unit 801 may push the possible steps to the falling edge register 830 that may occur on a future falling edge of a clock 817. The rising edge 821 and falling edge 830 registers may comprise shift registers or directly addressable registers.

At step 910, the logic unit 801 may receive at least one of a hold 805, direction 810, and step size 815 command at, for example, a rising edge of a clock 817. Based on the received direction 810 and step size 815 command, the logic unit may command the rising edge 821 and falling edge 830 registers to perform one of the following four alternative method steps, illustrated in 915, 930, 945, and 960. The illustrated alternatives in FIG. 9, however, do not limit other possible embodiments. Step 915 includes the alternative wherein the logic unit 801 receives a step size command of one and a direction command of positive. Step 920 includes the logic unit 801 commanding the rising edge register 821 to push the next stored positive quadrant and amplifier control signal from the rising edge register 821 onto the phase interpolation control bus 850 at the rising edge of the clock. Because the step size command is one, no action occurs at step 922 at the falling edge of the clock 817.

Step 930 includes the alternative wherein the logic unit 801 receives a step size command of one and a direction command of negative. Step 935 includes the logic unit 801 commanding the rising edge register 821 to push the next stored negative quadrant and amplifier control signal from the rising edge register 821 onto the phase interpolation control bus 850 at the rising edge of the clock. Because the step size command is one, no action occurs at step 940 at the falling edge of the clock 817.

Step 945 includes the alternative wherein the logic unit 801 receives a step size command of two and a direction command of positive. Step 950 includes the logic unit 801 commanding the rising edge register 821 to push the next stored positive quadrant and amplifier control signal from the rising edge register 821 onto the phase interpolation control bus 850 at the rising edge of the clock. Step 955 includes the logic unit 801 commanding the falling edge register 830 to push the second stored positive quadrant and amplifier control signal from the falling edge register 830 onto the phase interpolation control bus 850 at the falling edge of the clock.

Step 960 includes the alternative wherein the logic unit 801 receives a step size command of two and a direction command of negative. Step 965 includes the logic unit 801 commanding the rising edge register 821 to push the next stored negative quadrant and amplifier control signal from the rising edge register 821 onto the phase interpolation control bus 850 at the rising edge of the clock. Step 970 includes the logic unit 801 commanding the falling edge register 830 to push the second stored negative quadrant and amplifier control signal from the falling edge register 830 onto the phase interpolation control bus 850 at the falling edge of the clock. The process 900 may continue, continuing from steps 922, 940, 955, and 970 back to step 901, or in other embodiments, executing said process steps in parallel.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

CONCLUSION

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments.

What is claimed is:

1. A phase interpolator, comprising:
an in-phase amplifier configured to amplify an in-phase signal, including
a plurality of first type amplifiers responsive to a plurality of corresponding control signals, each of the plurality of first type amplifiers configured to amplify the in-phase signal by a unit gain amount when activated by the corresponding control signal;
a second type amplifier, coupled in parallel with the plurality of first type amplifiers, and configured to amplify the in-phase signal by one-half of the unit gain; and
a summing node that sums outputs of the plurality of first type amplifiers and an output of the second type amplifier,
wherein each of the plurality of first type amplifiers are switchably connected to an output of the in-phase amplifier responsive to the corresponding control signals so that a gain of the in-phase amplifier can be tuned in increments of the unit gain amount, and
wherein the second type amplifier is connected to the summing node in a non-switchable manner so that the gain of the in-phase amplifier includes at least the one-half of the unit gain.

2. The phase interpolator of claim 1, further comprising a multiplexer coupled to an input of the in-phase amplifier, and configured to provide either a first signal or a second signal as the in-phase signal, where the second signal is 180 degrees out of phase with the first signal.

3. The phase interpolator of claim 1, wherein
each of the first type amplifiers includes a first component amplifier and a second component amplifier having outputs switchably connected to each other and the summing node, and each configured to provide one-half of the unit gain.

4. The phase interpolator of claim 3, wherein the second type amplifier includes a third component amplifier and a fourth component amplifier, each configured to provide one-half of the unit gain, and wherein an output of the third component amplifier is disconnected from the summing node in a fixed non-switchable manner, and wherein the fourth component amplifier is connected to the summing node in a fixed non-switchable manner.

5. The phase interpolator of claim 1, further comprising a controller configured to generate the plurality of corresponding control signals according to a thermometer coded digital word, and wherein the second type amplifier is non-responsive to changes in said thermometer coded digital word.

6. The phase interpolator of claim 1, further comprising:
a quadrature amplifier configured to amplify a quadrature signal, including
a second plurality of the first type amplifiers responsive to a second plurality of corresponding control signals, each of the second plurality of first type amplifiers configured to amplify the quadrature signal by the unit gain amount when activated by the corresponding control signal;
an additional second type amplifier, coupled in parallel with the second plurality of first type amplifiers, and configured to amplify the quadrature signal by one-half of the unit gain; and
a second summing node that sums outputs of the second plurality of first type amplifiers and an output of the additional second type amplifier,
wherein each of the second plurality of first type amplifiers are switchably connected to an output of the quadrature amplifier responsive to the corresponding control signals so that a gain of the quadrature amplifier can be tuned in increments of the unit gain amount, and
wherein the additional second type amplifier is connected to the second summing node in a non-switchable manner so that the gain of the quadrature amplifier includes at least the one-half of the unit gain.

7. The phase interpolator of claim 6, further comprising a phase mixer to combine the outputs of the in-phase amplifier and the quadrature amplifier.

8. An apparatus to interpolate a phase of a signal, the signal comprising a first component and a second component, the apparatus comprising:
a first switch, configured to couple at least one of the first component and an anti-phase of the first component to an output of the first switch, in response to a first switch control signal;
a second switch, configured to couple at least one of the second component and an anti-phase of the second component, to an output of the second switch, in response to a second switch control signal;
a first amplifier, coupled to the first switch output and a summing node, configured to amplify the output of the first switch by a first quantity;
a second amplifier, coupled to the second switch output and the summing node, configured to amplify the output of the second switch by the first quantity;
a first plurality of amplifiers, coupled in parallel between the first switch and the summing node, each of the first plurality of amplifiers configured to selectively amplify the output of the first switch by a second quantity, in response to at least one of a first plurality of amplifier control signals; and
a second plurality of amplifiers, coupled in parallel between the second switch and the summing node, each of the second plurality of amplifiers configured to selectively amplify the output of the second switch by the second quantity, in response to at least one of a second plurality of amplifier control signals.

9. The apparatus of claim 8, wherein the first component is an in-phase component of the signal and the second component is a quadrature component of the signal.

10. The apparatus of claim 8, wherein the second quantity is twice the first quantity.

11. The apparatus of claim 8, further comprising a controller, coupled to the first switch, the second switch, the first plurality of amplifiers, and the second plurality of amplifiers, the controller configured to:
generate the first switch control signal;
generate the second switch control signal;
generate the first plurality of amplifier control signals; and
generate the second plurality of amplifier control signals.

12. The apparatus of claim 11, wherein the controller is configured to:
generate the first switch control signal to couple the first component to the output of the first switch at a first time period;

generate the second switch control signal to couple the second component to the output of the second switch at the first time period;

generate the first plurality of amplifier control signals to increase amplification of the first component by a third quantity at the first time period;

generate the second plurality of amplifier control signals to decrease amplification of the second component by the third quantity at the first time period; and generate the second switch control signal to couple the anti-phase of the second component to the output of the second switch at a second time period.

13. The apparatus of claim 11, wherein the controller is configured to generate the first and second plurality of amplifier control signals using a thermometer coded digital word, and wherein at least one bit of the thermometer coded digital word addresses at least one of the first and second plurality of amplifiers.

14. The apparatus of claim 11, wherein the controller is configured to generate each of the second plurality of amplifier control signals to be the inverse of each of the first plurality of amplifier control signals.

15. The apparatus of claim 11, wherein each of the first plurality of amplifiers and each of the second plurality of amplifiers comprises an activation switch, coupled in series between the summing node and each of the outputs of the first plurality of amplifiers and second plurality of amplifiers, configured to open or close in response to at least one of the first plurality of amplifier control signals and the second plurality of amplifier control signals.

16. The apparatus of claim 12, wherein the first time period comprises a first rising edge of a clock signal, and the second time period comprises a second rising edge of the clock signal.

17. The apparatus of claim 8, wherein the first amplifier comprises two amplifiers with the first amplifier activated and the second amplifier deactivated.

18. The apparatus of claim 8, wherein each of the first plurality of amplifiers and each of the second plurality of amplifiers comprises two amplifiers with the inputs, outputs, and amplifier control signals coupled together.

19. The apparatus of claim 12, wherein the first time period comprises a first rising edge of a clock signal, and the second time period comprises a first falling edge of the clock signal.

20. The apparatus of claim 12, wherein the second time period occurs prior to the first time period.

* * * * *